United States Patent
Basovnik et al.

(10) Patent No.: US 9,465,811 B2
(45) Date of Patent: Oct. 11, 2016

(54) POLYGON-BASED INDEXING OF PLACES

(71) Applicant: Facebook, Inc., Menlo Park, CA (US)

(72) Inventors: Stanislav Basovnik, Mountain View, CA (US); Abhinav A. Vora, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 282 days.

(21) Appl. No.: 14/220,493

(22) Filed: Mar. 20, 2014

(65) Prior Publication Data

US 2015/0269250 A1 Sep. 24, 2015

(51) Int. Cl.
*G06F 17/30* (2006.01)

(52) U.S. Cl.
CPC .................. *G06F 17/30241* (2013.01)

(58) Field of Classification Search
None
See application file for complete search history.

(56) References Cited

U.S. PATENT DOCUMENTS

| 7,634,465 B2 | 12/2009 | Sareen |
| 2012/0166416 A1 | 6/2012 | Murdock |
| 2012/0191695 A1 | 7/2012 | Xia |
| 2013/0066881 A1 | 3/2013 | Park |
| 2013/0073686 A1* | 3/2013 | Sandholm .......... G06Q 30/0631 709/219 |
| 2013/0155068 A1* | 6/2013 | Bier .................. G06Q 10/10 345/440 |
| 2013/0275884 A1* | 10/2013 | Katragadda .......... H04L 65/403 715/753 |

OTHER PUBLICATIONS

International Search Report and Written Opinion from International Application No. PCT/US2014/035386, Dec. 9, 2014.
Jin, J. et al., "Design and Compressed Storage of Inverted Index Based on Mixed Word Segmentation", IEEE, Knowledge Discovery and Data Mining, 2008. WKDD.2008.137. First International Workshop on Jan. 23-24, 2008.
EP Search Report from European Patent Office for EP Application No. 14184878.8, Feb. 20, 2015.

* cited by examiner

*Primary Examiner* — Wilson Lee
(74) *Attorney, Agent, or Firm* — Baker Botts L.L.P.

(57) ABSTRACT

In one embodiment, a method includes receiving an identification of a location. The method further includes accessing an inverted index that comprises a plurality of records, where each record corresponds to a map tile and identifies one or more places corresponding to the map tile. At least one of the places identified in the inverted index is identified in multiple records corresponding to multiple map tiles, where the map tiles collectively define an area that circumscribes the place. The method also includes identifying based on the inverted index one or more places associated with the location.

20 Claims, 8 Drawing Sheets

US 9,465,811 B2

POLYGON-BASED INDEXING OF PLACES

TECHNICAL FIELD

This disclosure generally relates to determining a user's location and identifying places associated with a user's location.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a place, such as for example, an airport, park, shopping mall, corporate campus, college campus, stadium, museum, neighborhood, city, movie theater, restaurant, or landmark, may be modeled as a polygon. The polygon may define an area that circumscribes or closely surrounds the place. A bounding box may be constructed around the polygon, and then a N×N grid of sample points is superimposed over the bounding box, where N is any suitable positive integer (e.g., 10, 20, 30, etc.). Sample points located outside the polygon are discarded, and sample points located within or on the border of the polygon are kept. The remaining sample points may be associated with the place, and each sample point may be associated with a particular map tile, where each map tile has a unique tile ID.

An inverted index for a map, a geographic area, or a place may be determined based at least in part on a grid of sample points and map tiles. An inverted index may be organized into records or entries, and each record may include a tile identifier along with one or more identifiers of places or objects associated with the tile. An inverted index may be used in connection with the retrieval of a user's location.

A forward index associated with a place may be determined based at least in part on construction of a polygon and bounding box around the place. A forward index for a place may include one or more geo-location identifiers for sample points associated with that place. A forward index may be used to determine where a user is located, whether the user is located in or near a particular place, what place or places are nearby a user, or the distance of a user to one or more places. For example, a forward index can be used to determine a distance between a user's location and a place by calculating distances from the user to each sample point associated with the place. The distance between the user and the place is then the minimum of the calculated distances. Additionally, a forward index may be used in the scoring and ranking of places located near a user.

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

Figure 1:
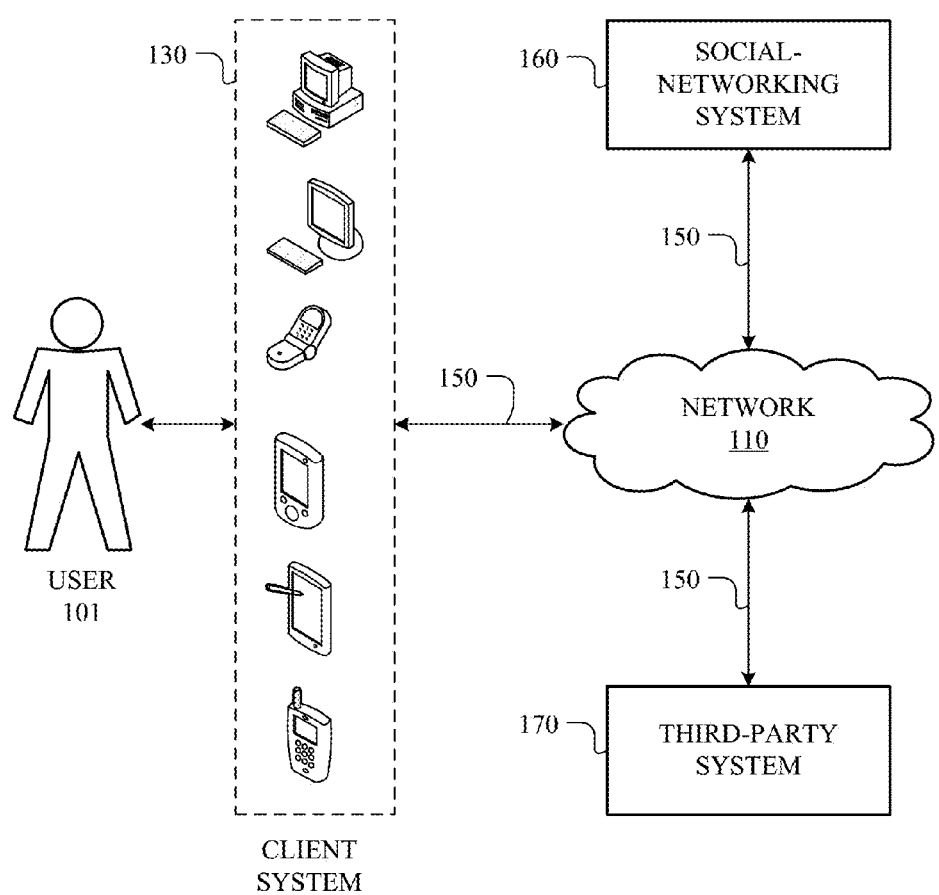
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG.

1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 160 through blocking, data hashing, anonymization, or other suitable techniques as appropriate. In particular embodiments, third-party system 170 may be a network-addressable computing system that can host one or more forward or reverse indices that are based at least in part on polygon-based indexing of places. Third-party system 170 may generate, store, receive, and send results of a location-based query that involves a forward or reverse index, such as, for example, a query from a user requesting places located near the user. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
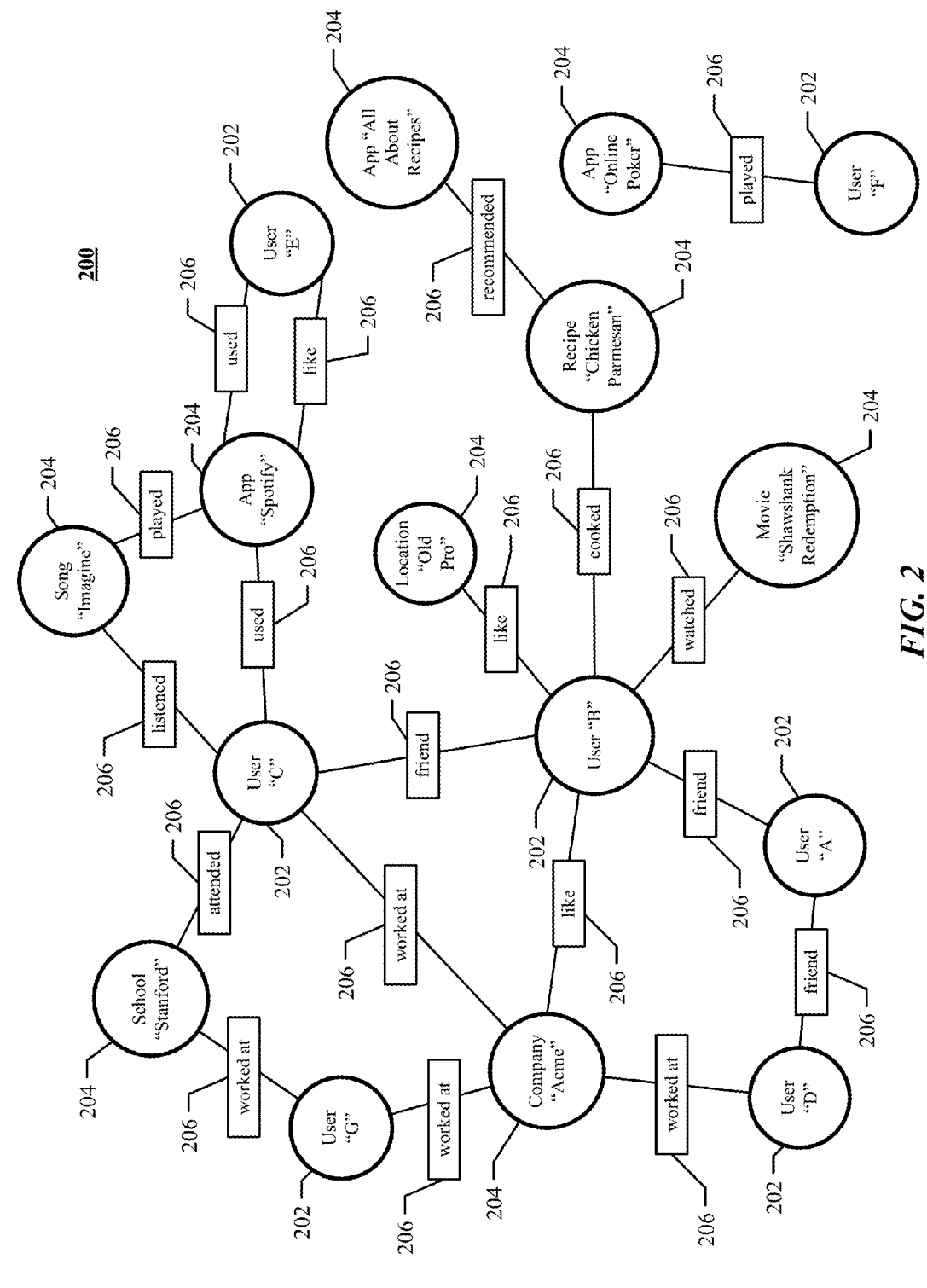
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, an airport, park, shopping mall, corporate campus, college campus, stadium, museum, neighborhood, city, movie theater, restaurant, landmark, or any other suitable place or combination of suitable places); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, the social-networking system 160 may determine a geographic location (hereinafter also "location") of an object (e.g., a user, a concept, or a client system 130 associated with a user or concept). The location of an object may be identified and stored as a street address (e.g., "1601 Willow Road"), a set of geographic coordinates (e.g., latitude and longitude), a reference to another location or object (e.g., "the coffee shop next to the train station"), a reference to a map tile (e.g., "map tile 312"), or using another suitable identifier. In particular embodiments, the location of an object may be provided by a user of an online social network. As an example and not by way of limitation, a user may input his location by checking-in at the location or otherwise providing an indication or an identification of his location. As another example and not by way of limitation, a user may input the location of a concept (e.g., a place or venue) by accessing the profile page for the concept and entering the location information (e.g., the street address) of the concept.

In particular embodiments, the location of a client system 130 equipped with cellular, Wi-Fi, global positioning system (GPS), or other suitable capabilities may be identified with geographic-positioning signals. As an example and not by way of limitation, a client system 130 may include one or more sensors that may facilitate geo-location functionalities of the system. Processing of sensor inputs by the client system 130 with one or more sensor devices (for example, processing a GPS sensor signal and displaying in the device's graphical user interface a map of a location corresponding to the GPS sensor signal) may be implemented by a combination of hardware, software, and/or firmware (or device drivers). Geographic-positioning signals may be obtained by cell tower triangulation, Wi-Fi positioning, or GPS positioning. In particular embodiments, a geographic location of an Internet-connected computer can be identified by the computer's IP address. A client system 130 may also have additional functionalities incorporating geographic-location data of the device, such as, for example, providing driving directions, displaying a map of a current location, or providing information of nearby points of interest such as restaurants, gas stations, parks, etc. As an example and not by way of limitation, a web browser application on the client system 130 may access a mapping library (e.g., via a function call) that generates a map containing a GPS location obtained by a device driver interpreting a GPS signal from a GPS sensor, and display the map in the web browser application's graphical user interface. In particular embodiments, the location of a user may be determined from a search history associated with the user. As an example and not by way of limitation, if a particular user has previously queried for objects in a particular location, the social-networking system 160 (or the search-engine system 170) may assume that the user is still at that particular location. Although this disclosure describes determining the location of an object in a particular manner, this disclosure contemplates determining the location of an object in any suitable manner.

In particular embodiments, the social-networking system 160 may maintain a database of information relating to locations or places. The social-networking system 160 may also maintain meta information about particular locations or places, such as, for example, photos of the location, advertisements, user reviews, comments, "check-in" activity data, "like" activity data, hours of operation, or other suitable information related to the location. In particular embodiments, a location or place may correspond to a concept node 204 in a social graph 200. The social-networking system 160 may allow users to access information regarding a location or place using a client application (e.g., a web browser or other suitable application) hosted by a client system 130. As an example and not by way of limitation, social-networking system 160 may serve webpages (or other structured documents) to users that request information about a location or place. In addition to user profile and location information, the system may track or maintain other information about the user. As an example and not by way of limitation, the social-networking system 160 may support geo-social-networking functionality including one or more location-based services that record the user's location. As an example and not by way of limitation, users may access the geo-social-networking system using a special-purpose client application hosted by a client system 130 of the user (or a web- or network-based application using a browser client). The client application may automatically access GPS or other geo-location functions supported by the client system 130 and report the user's current location to the geo-socialnetworking system. In addition, the client application may support geo-social networking functionality that allows users to "check-in" at various locations or places and communicate this location to other users. A check-in to a given location or place may occur when a user is physically located at a location or place and, using a client system 130, accesses the geo-social-networking system to register the user's presence at the location or place. The social-networking system 160 may automatically check-in a user to a location or place based on the user's current location and past location data. In particular embodiments, the social-networking system 160 may allow users to indicate other types of relationships with respect to particular locations or places, such as "like," "fan," "worked at," "recommended," "attended," or another suitable type of relationship. In particular embodiments, "check-in" information and other relationship information may be represented in the social graph 200 as an edge 206 connecting the user node 202 of the user to the concept node 204 of the location or place.

Figure 3:
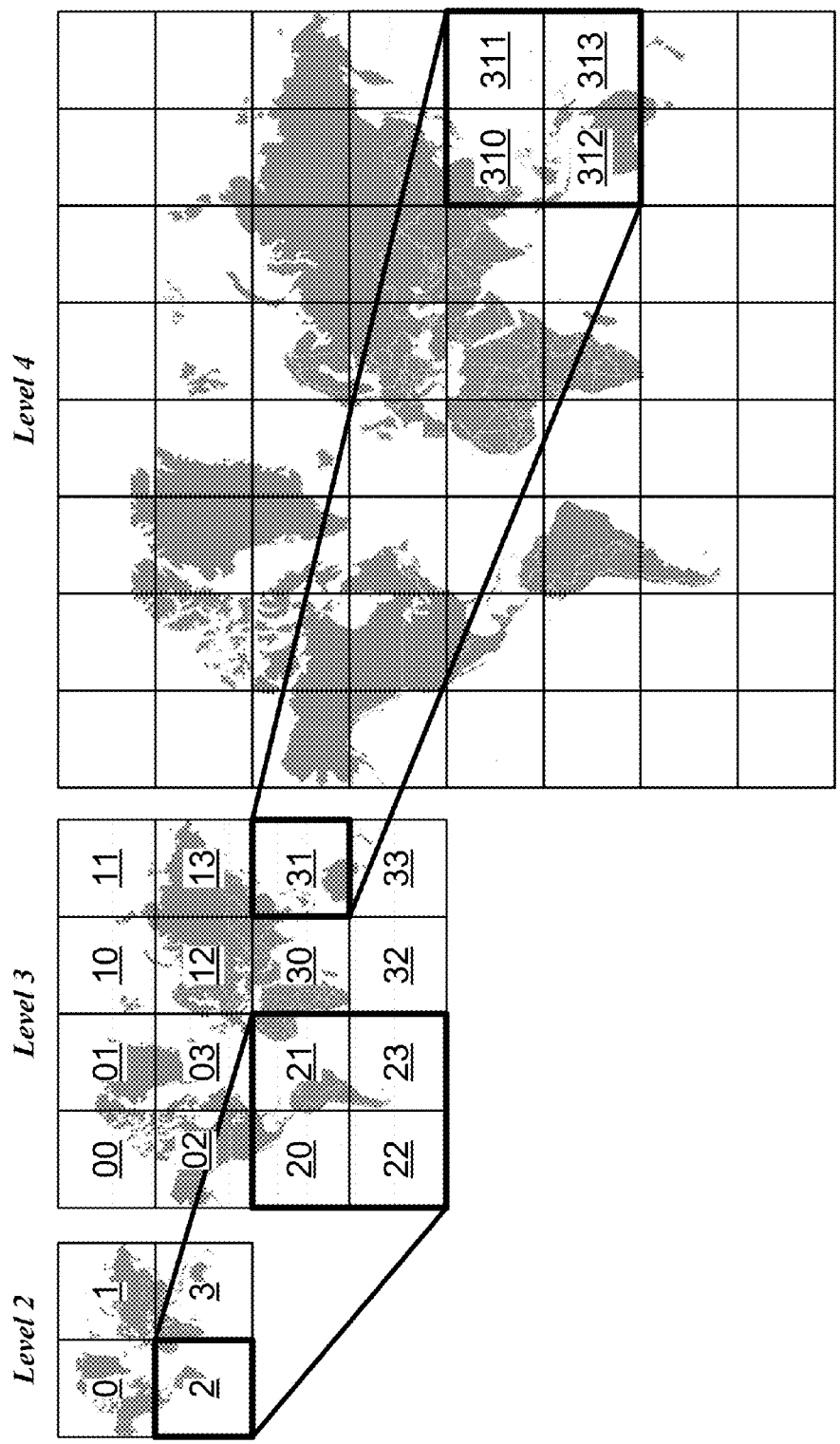
FIG. 3 illustrates example maps with example map tiles.

FIG. 3 illustrates example maps with example map tiles. In particular embodiments, a map may be used to represent a geographic area, such as the world or a portion thereof, a building, a campus, a park, or any other suitable place or area. The map may be divided into map tiles (hereinafter also "tiles"), where each tile represents a particular geographic area of the map. Thus, particular locations or places may be within particular tiles of a map. As an example and not by way of limitation, a location X may be within a first tile, and locations Y and Z may be within a second tile. In particular embodiments, a tile-based map may be organized in a tree-data structure. A root node in the data structure may correspond to the map, and the child nodes in the data structure may correspond to tiles. The tree-data structure may have tiles organized into a plurality of levels, where the first level corresponds to the root node (i.e., the map), and subsequent levels correspond to subsequent generations of child nodes. In particular embodiments, a map may comprise a plurality of levels of tiles. The tiles at each level may represent different sized portions of the map, with parent nodes representing larger portions of the map than child nodes. In other words, tiles at a higher level will be higher in the tree-data structure (i.e., closer to the root node), while tiles at a lower level with be lower in the tree-data structure. As an example and not by way of limitation, a map may comprise M levels of tiles, which may be labeled levels 1 to M. Level 1 may comprise a single tile representing the map (e.g., the world), corresponding to a root node in the tree-data structure.

In particular embodiments, a particular level may include uniform tiles each having approximately the same size and shape, or a particular level may include tiles having a plurality of sizes or shapes. In particular embodiments, a particular level may include square tiles arranged in a grid pattern. In particular embodiments, tiles may be substantially square, and the tiles of a particular level may have approximately the same size. In particular embodiments, level m may include a $2^{(m-1)}$ by $2^{(m-1)}$ grid of tiles with a total of $2^{2 \times (m-1)}$ tiles. As an example and not by way of limitation, level 5 may include a 16×16 grid with a total of 256 square-shaped tiles, each tile having approximately the same size. In the example of FIG. 3, level 2 includes four tiles, each representing one quadrant of a world map. In particular embodiments, each tile in a particular level of a map may have a unique tile identifier or tile identification, which may be referred to as a tile ID. In FIG. 3, the four tiles of level 2 have tile IDs 0, 1, 2, and 3, respectively. Level 3 in FIG. 3 is a 4×4 grid that includes sixteen tiles, where each tile from level 2 is divided into quadrants to form four additional tiles at level 3. As an example, tile 2 from level 2 is subdivided in level 3 into four tiles with tile IDs 20, 21, 22, and 23, respectively. Level 4 is an 8×8 grid that includes sixty-four tiles, where each tile from level 3 has been divided into quadrants to form four additional tiles at level 4. As an example, tile 31 from level 3 is subdivided in level 4 into four tiles with tile IDs 310, 311, 312, and 313, respectively. This process of dividing a tile at one level to define smaller tiles at a subsequent level may be repeated through level M. Leaf nodes in the tree-data structure will correspond to tiles that are not subdivided further. Thus, continuing with the previous example, the tiles at level M would correspond to the leaf nodes in the tree-data structure representing the tiles. Similarly, a child node corresponding to a first tile at level m will be connected in the tree-data structure to the parent node corresponding to a second tile at level m−1, where the first tile is located within the second tile. Although this disclosure describes dividing tiles in a level in a particular way to form additional tiles, this disclosure contemplates dividing tiles in any suitable way to form additional tiles. Moreover, although this disclosure describes and illustrates particular maps with particular tiles, this disclosure contemplates any suitable maps having any suitable tiles.

In particular embodiments, a tile in a map may include one or more objects or places having locations within the tile. Where a tile represents a particular geographic area, an object or place having a location within that geographic area may be considered to be within the tile. In particular embodiments, an object or place having a location within a particular tile may be considered associated with the tile. These objects or places may also be represented in the tree-data structure corresponding to the map tiles, where each object or place may correspond to a sub-leaf node that is connected to the leaf node representing the tile containing the object or place. Although this disclosure describes and illustrates particular maps with particular objects or places located within the maps, this disclosure contemplates any suitable maps having any suitable objects or places located within the maps.

In particular embodiments, a place may refer to a large area or structure or a combination of one or more large areas or one or more structures. As examples and not by way of limitation, a place may include an airport, park, shopping mall, corporate campus, college campus, stadium, museum, neighborhood, city, movie theater, restaurant, landmark, or any other suitable place or combination of suitable places. In particular embodiments, a place may have a size or dimension on the order of approximately 10 meters, 100 meters, 1 kilometer, 10 kilometers, or any other suitable distance. In particular embodiments, a place may be associated with a particular map tile if all or part of the place is located within the particular map tile. In particular embodiments, a place may be associated with a particular map tile if at least part of the place is located within a pre-determined threshold distance of the particular map tile. In particular embodiments, multiple parts of a particular place may be located within multiple tiles, and the place may be associated each of with these multiple tiles. In particular embodiments, a particular tile may contain all or part of multiple places, and the particular tile may be associated with each of these multiple places. As an example and not by way of limitation, a particular tile may represent a particular geographic area that includes all or part of a restaurant, museum, and college campus, and the particular tile may be associated with each of these places. In particular embodiments, a place may be associated with one or more tiles, and a tile may be associated with one or more places. Although this disclosure describes and illustrates particular places associated with particular tiles, this disclosure contemplates any suitable places associated with any suitable tiles.

In particular embodiments, a tile may include or may be associated with a sample point, where the sample point is associated with geo-location coordinates, such as for example, a pair of latitude and longitude coordinates. In particular embodiments, a sample point that is associated with a particular tile may identify a location of the tile. In particular embodiments, a sample point associated with a particular tile may be situated at a center, edge, corner, or any other suitable location on or within the tile. As an example and not by way of limitation, a sample point may have a latitude-longitude pair of 37.485° and −122.148°, and the sample point may be associated with and located at the center of a particular map tile with a map tile ID 12345. Such an example map tile with tile ID 12345 may be referred to as having a location associated with the above sample point. Although this disclosure describes and illustrates particular sample points associated with particular tiles, this disclosure contemplates any suitable sample points associated with any suitable tiles.

Figure 4:
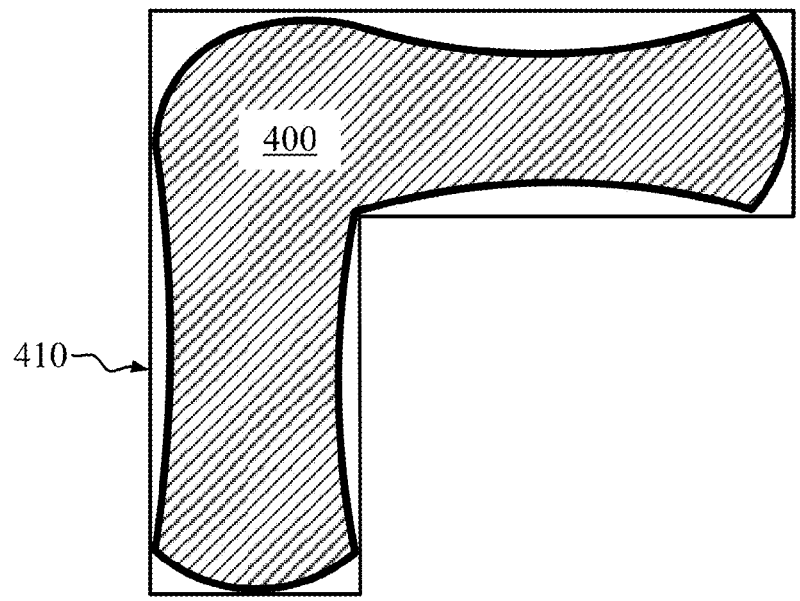
FIG. 4 illustrates an example place circumscribed by an example polygon.

FIG. 4 illustrates an example place 400 circumscribed by an example polygon 410. In particular embodiments, a place may be modeled as a polygon that defines an area that circumscribes, envelopes, or encompasses the place. In FIG. 4, place 400 is modeled as polygon 410, and polygon 410 includes six straight-line segments. In particular embodiments, a polygon that circumscribes a place may refer to a polygon that closely surrounds or forms a boundary around a place. In particular embodiments, one or more lines that make up circumscribing polygon 410 may touch, overlap, or intersect one or more lines or vertices that form an outer boundary of place 400. Although this disclosure describes and illustrates particular places and particular polygons that circumscribe particular places, this disclosure contemplates any suitable places and any suitable polygons that circumscribe any suitable places.

Figure 5:
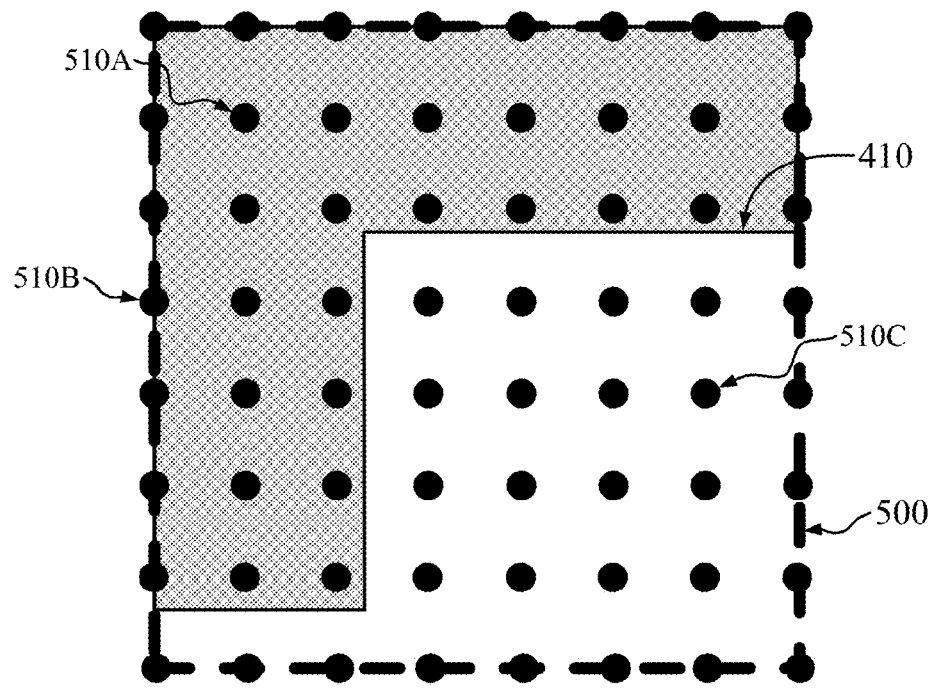
FIG. 5 illustrates an example bounding box constructed around an example polygon.

FIG. 5 illustrates an example bounding box 500 constructed around example polygon 410. In particular embodiments, bounding box 500 may have a square shape, a rectangular shape, or any other suitable shape, and bounding box 500 may encompass or enclose polygon 410. In FIG. 5, bounding box 500, represented by a dashed line, has a square shape. In particular embodiments, a grid of sample points 510 may be superimposed onto the area of bounding box 500. In particular embodiments, sample points 510 may be arranged into a N×N grid of evenly spaced points, where N is 10, 20, 30, or any suitable positive integer. In the example of FIG. 5, sample points 510 are arranged into an 8×8 grid of 64 evenly spaced points. In particular embodiments, as described above, each sample point 510 may represent a location associated with a geo-location identifier, such as for example, a latitude and longitude pair. In particular embodiments, sample points 510 located outside polygon 410 may be discarded, and sample points 510 located within or on the border of polygon 410 may be kept. In FIG. 5, the 28 sample points located outside polygon 410 may be discarded, and the 36 sample points located within or on the border of polygon 410 may be kept. As an example and not by way of limitation, sample point 510C, located outside polygon 410, is discarded, and sample points 510A and 510B, located within or on the border of polygon 410, respectively, are kept. Although this disclosure describes and illustrates particular bounding boxes and particular sample points constructed with respect to particular polygons, this disclosure contemplates any suitable bounding boxes and any suitable sample points constructed with respect to any suitable polygons.

Figure 6:
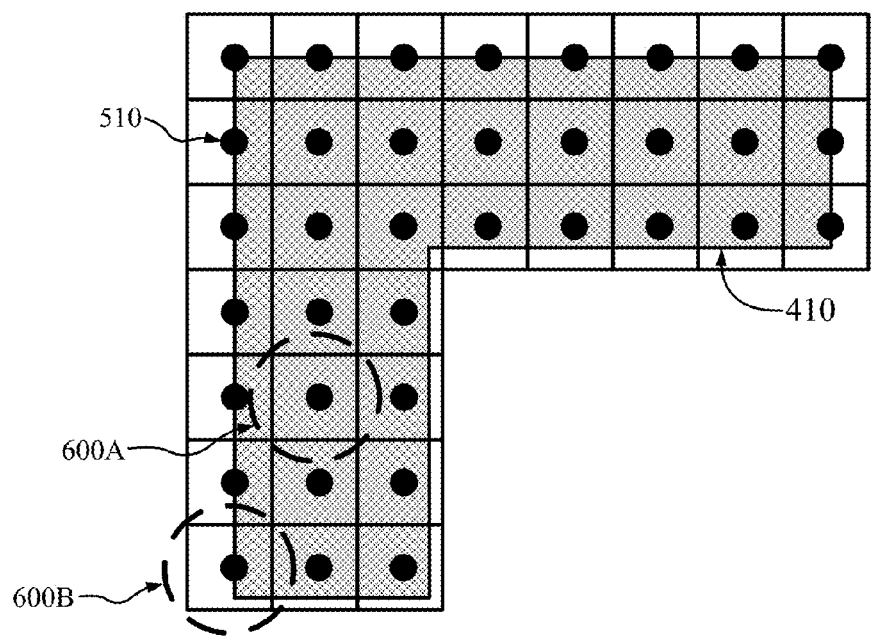
FIG. 6 illustrates the example polygon of FIG. 5 with example map tiles and sample points.

FIG. 6 illustrates the example polygon 410 of FIG. 5 with example map tiles 600 and sample points 510. In FIG. 6, sample points located outside polygon 410 have been removed, and the remaining sample points 510 are those 36 sample points 510 located on or within polygon 410. In particular embodiments, each sample point 510 may be associated with a particular map tile 600, and each map tile 600 has a unique map tile ID. In FIG. 6, each map tile 600 has an associated sample point 510 located at the center of the map tile. In particular embodiments, some map tiles (such as for example, map tile 600A) may be fully contained within polygon 410, and some map tiles (such as for example, map tile 600B) may be partially contained within polygon 410. In particular embodiments, a group of map tiles may collectively define an area that circumscribes a place or a polygon representing a place. An area circumscribing a place or polygon may refer to an area that encompasses, covers, or envelopes the place or polygon. The group of thirty-six tiles 600 in FIG. 6 define an area that circumscribes place 400 and polygon 410. In particular embodiments, a place may be associated with each map tile of a group of map tiles that circumscribe the place. In FIG. 6, place 400 is associated with the 36 map tiles 600 that circumscribe it. Although this disclosure describes and illustrates particular polygons covered by particular map tiles having particular sample points, this disclosure contemplates any suitable polygons covered by any suitable map tiles having any suitable sample points.

In particular embodiments, an inverted index for a map, a geographic area, or a place may be determined based at least in part on a grid of sample points and tiles as described above. In particular embodiments, determining an inverted index based at least in part on a grid of sample points and tiles as described above may be referred to as polygon-based indexing of places. In particular embodiments, an inverted index may include tile IDs and places or objects associated with tile IDs. An inverted index may be organized into records or entries, and each record may include a tile ID along with one or more object IDs or place IDs of places associated with the tile represented by the tile ID. In particular embodiments, a place ID is a unique identifier associated with or used to identify a particular place, and a place ID may be referred to as a place identifier or a place identification. As an example and not by way of limitation, place 400 illustrated in FIG. 4 may be a park having a place ID of "400." In particular embodiments, a place associated with a particular tile may correspond to a place that is located at least partially within or located within a predetermined threshold distance of the particular tile. As an example and not by way of limitation, an inverted-index record for tile 600A of FIG. 6 may be expressed as "tile 600A: 400," where 600A is the tile ID, and 400 is the place ID for a place associated with tile 600A. Similarly, as another example, an inverted-index record for tile 600B may be expressed as "tile 600B: 400." In FIG. 6, tile 600B may be associated with place 400 as well as one or more other places, objects, or concepts. As an example and not by way of limitation, tile 600B may be associated with place 400 as well as a restaurant with ID 9876, a store with ID 54321, and another place with ID 6565. As another example, an inverted-index record for tile 600B may be expressed as "tile 600B: 400, 9876, 54321, 6565."

Figure 7:
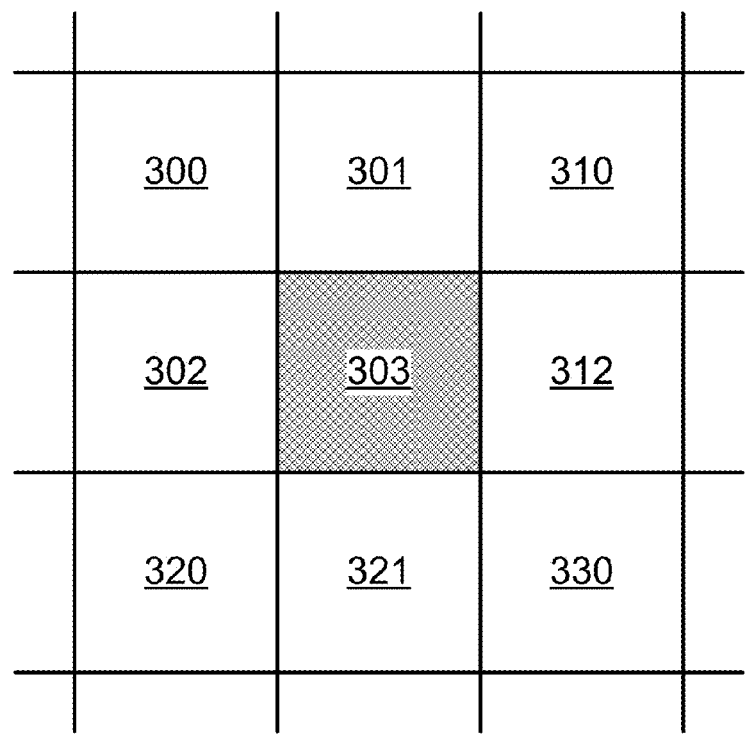
FIG. 7 illustrates an example map tile and eight surrounding map tiles.

FIG. 7 illustrates an example map tile 303 and eight surrounding tiles (300, 301, 310, 312, 330, 321, 320, and 302). In particular embodiments, an inverted-index record for a particular tile may include place IDs for one or more places located at least partially within the particular tile or at least partially within one or more tiles located adjacent to or around the particular tile. In particular embodiments, an inverted-index record may include places located at least partially within or within a pre-determined threshold distance of a particular tile. In FIG. 7, an inverted-index record for tile 303 may include place IDs for places located at least partially within tile 303 or any of the eight surrounding tiles. As an example and not by way of limitation, if part of place 710 is located within tile 303 and part of place 720 is located within tile 320, then an inverted-index record for tile 303 may be expressed as "tile 303: 710, 720." Additionally, if tile 303 is associated with a cafe with ID 7676 and tile 300 is associated with a store with ID 4545, then, as another example, an inverted-index record for tile 303 may be expressed as "tile 303: 710, 720, 7676, 4545." Although this disclosure describes and illustrates particular inverted indices that include particular records having particular information about tiles and places, this disclosure contemplates any suitable inverted index that includes any suitable records having any suitable information about tiles or places.

In particular embodiments, an inverted index may be used in connection with the retrieval of a user's location. In particular embodiments, a computing system may receive from a user an identification of a location. As an example and not by way of limitation, the computing system may be a social-networking system 160, the user's location may be transmitted to the social-networking system 160 by a client system 130, and the identification of the user's location may include a set of geographic coordinates (e.g., a latitude-longitude pair). In particular embodiments, a computing system may access an inverted index, and based on the user's location and information contained in the inverted index, the computing system may identify one or more places, objects, or map tiles associated with the user's location. As an example and not by way of limitation, based on a user's location and information in an inverted index, a computing system may determine that the user is located in a particular place, such as a park. As another example and not by way of limitation, based on a user's location and information in an inverted index, a computing system may determine that the user is located near one or more places, such as for example, a park and a shopping mall. In particular embodiments, based on the user's location, a computing system may determine a tile ID for a map tile in which the user is located. In particular embodiments, the system may determine one or more tile IDs for map tiles that are located adjacent to the user's map tile or within a pre-determined threshold distance of the user's map tile. Although this disclosure describes and illustrates particular ways in which an inverted index may be used in connection with a user's location, this disclosure contemplates any suitable way in which an inverted index may be used in connection with a user's location.

In particular embodiments, a forward index associated with a place may be determined based at least in part on construction of a polygon and bounding box as described above. In particular embodiments, determining a forward index based at least in part on construction of a polygon and bounding box as described above may be referred to as polygon-based indexing of places. In particular embodiments, while an inverted index may include a tile ID and places that are associated with that tile, a forward index may include a place ID and tiles that are associated with that place. In particular embodiments, a forward index may be generated for a particular place and may include one or more geo-location identifiers or one or more tile IDs associated with that place. As an example and not by way of limitation, a forward index for a particular place may include one or more latitude-longitude pairs, where each latitude-longitude pair corresponds to a sample point associated with the particular place. As another example and not by way of limitation, a forward index for a particular place may include one or more tile IDs corresponding to tiles associated with the particular place. In particular embodiments, a group of map tiles associated with a place by a forward index may refer to a group of map tiles that collectively define an area that circumscribes the place. In FIG. 6, polygon 410, which is associated with place 400, contains or partially contains a total of thirty-six tiles 600, and these thirty-six tiles 600 circumscribe place 400 and polygon 410. A forward index for place 400 may include geo-location identifiers (e.g., latitude and longitude pairs) associated with each of the thirty-six sample points 510 illustrated in FIG. 6. A forward index for place 400 may include the tile IDs of the thirty-six tiles 600 illustrated in FIG. 6. As an example and not by way of limitation, an entry in a forward index for place 400 may be expressed as "place 400: lat-long_1, . . . , lat-long_n, . . . , lat-long_36," where lat-long_n is a latitude-longitude pair corresponding to the nth sample point. As another example and not by way of limitation, an entry in a forward index for place 400 may be expressed as "place 400: tileID_1, . . . , tileID_n, . . . , tileID_36," where tileID_n is the tile ID of the nth tile. Although this disclosure describes and illustrates particular forward indices that include particular place IDs, location identifiers, or tile IDs, this disclosure contemplates any suitable forward indices that include any suitable place IDs, location identifiers, or tile IDs.

In particular embodiments, an inverted index and a forward index may be determined based at least in part on polygon-based indexing with a N×N grid of sample points. In particular embodiments, the grids used for the forward and inverted indices may have the same number of sample points. As an example and not by way of limitation, the grids used for a forward and inverted indices may be based on a 30×30 grid of 900 sample points. In particular embodiments, the grids used for the forward and inverted indices may have different numbers of sample points. As an example and not by way of limitation, a grid used for an inverted index may be based on a 30×30 grid of 900 sample points, and a grid used for a forward index may be based on a 10×10 grid of 100 sample points. Although this disclosure describes and illustrates particular forward and inverted indices based on particular grids having particular numbers of sample points, this disclosure contemplates any suitable forward or inverted indices based on any suitable grids having any suitable number of sample points.

Figure 8:
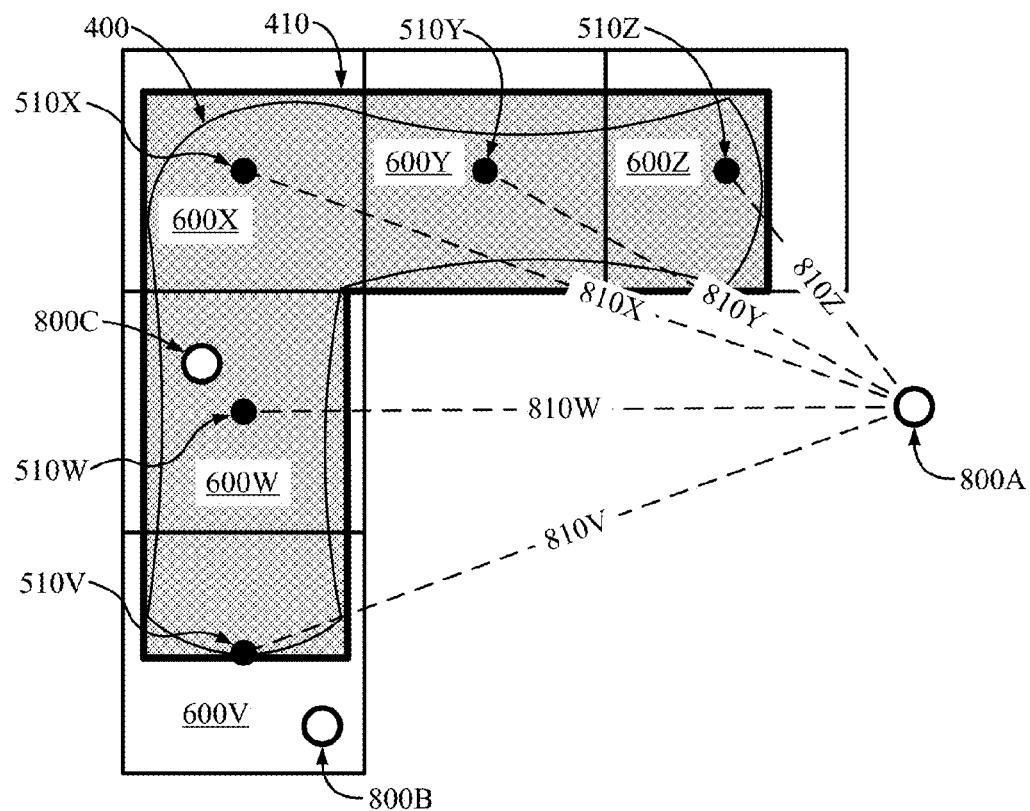
FIG. 8 illustrates the example place and example polygon of FIG. 4 and example map tiles.

FIG. 8 illustrates example place 400 and example polygon 410 of FIG. 4 and example map tiles 600. In FIG. 8, polygon 410 represents place 400 and is circumscribed by five map tiles: 600V, 600W, 600X, 600Y, and 600Z. Place 400 is associated with these five map tiles, and each map tile 600 is associated with a sample point 510 that represents a location identifier of the map tile. In particular embodiments, a forward-index entry or record for place 400 may include information related to the five sample points 510V-510Z (e.g., latitude-longitude pairs for each sample point) or the five map tiles 600V-600Z (e.g., tile IDs for each map tile). As an example and not by way of limitation, an entry in a forward index for place 400 of FIG. 8 may include tile IDs for each map tile associated with place 400 and may be expressed as "place 400: 600V, 600W, 600X, 600Y, 600Z." As another example and not by way of limitation, a forward-index record for place 400 may include location identifiers (e.g., latitude-longitude pairs) for the five sample points 510V-510Z associated with place 400 and may be expressed as "place 400: lat-long_510V, lat-long_510W, lat-long_510X, lat-long_510Y, lat-long_510Z." Although this disclosure describes and illustrates particular forward indices based on particular polygons and particular map tiles, this disclosure contemplates any suitable forward indices based on any suitable polygons and any suitable map tiles.

In particular embodiments, a forward index, which may include information about a place and sample points associated with the place, may be used to determine where a user is located, whether the user is located in or near a particular place, what place or places are nearby a user, or the distance of a user to one or more places. In particular embodiments, a determination of where a user is located, whether the user is located in or near a particular place, what place or places are nearby a user, or the distance of a user to one or more places may be performed by a computing system based at least in part on an identification of a location (e.g., a latitude-longitude pair received from a client system 130). In particular embodiments, a computing system may determine a distance of user 800A to place 400 by determining distances between user 800A and each sample point 510 or map tile 600 associated with place 400. In particular embodiments, the distance between user 800A and place 400 may be the minimum of the distances between user 800A and each sample point 510 or map tile 600 associated with place 400. In FIG. 8, user 800A is located near place 400, and distances 810V-810Z between user 800A and each of sample points 510V-510Z, respectively, may be determined. The distance 810 between user 800A and place 400 may be determined to be distance 810Z, which is the minimum distance between user 800A and each of the sample points 510 associated with place 400. Although this disclosure describes and illustrates determining a particular distance between a user and a place based at least in part on particular sample points or map tiles, this disclosure contemplates determining any suitable distance between a user and a place based at least in part on any suitable sample points or map tiles.

Previous techniques related to determining a user's location and identifying places associated with a user's location may model a place (e.g., Golden Gate Park) as a single point (e.g., a single pair of latitude and longitude coordinates). However, modeling a place as a single point can lead to an inaccurate or non-optimal determination of distances, locations, or places associated with a user's location. As an example, a previous technique that models Golden Gate Park as a place associated with a single latitude-longitude pair may determine that a user is located about 1 mile from the park when the user may actually be located across the street or within 100 feet of the park. Particular embodiments of this disclosure address some of the shortcomings of previous techniques by modeling places as polygons, where each place is then associated with multiple sample points rather than a single sample point.

In particular embodiments, a computing system may access a forward index and determine where a user is located or whether a user is located at or near a particular place. As an example and not by way of limitation, based on a location identifier sent to social-networking system 160 by client system 130 of user 800A, social-networking system 160 may determine that user 800A is located near or within a pre-determined threshold distance of place 400. In particular embodiments, a computing system may determine that a user is located within a particular tile, and if that particular tile is associated with a particular place, then the computing system may determine that the user is located at or within that particular place. As an example and not by way of limitation, in response to a query from user 800B in FIG. 8, a computing system may determine that user 800B is located within tile 600V, which is associated with place 400. In response to the query, the computing system may return a response indicating that user 800B is located at place 400. As another example and not by way of limitation, in response to a query from user 800C in FIG. 8, a computing system may determine that user 800C in is located within tile 600W, which is associated with place 400. In response to the query, the computing system may return a response indicating that user 800C is located at place 400. Additionally, in response to the query, the computing system may return a response indicating one or more objects (e.g., a bookstore or a coffee shop) located within tile 600W or within one or more adjacent tiles (e.g., tile 600V or tile 600X). Although this disclosure describes and illustrates particular distances or places determined based on particular locations or forward indices, this disclosure contemplates any suitable distances or places determined based on any suitable locations or forward indices.

In particular embodiments, in response to a query from a user, a computing system may determine one or more scores associated with one or more places or objects. In particular embodiments, the places or objects may be located at the user's location, within a pre-determined threshold distance of the user, or within a tile associated with or adjacent to the user's tile. In particular embodiments, a score for a place or object may be based at least in part on information in a forward index, information in an inverted index, the user's location, or the distance of the user to the place or object. In particular embodiments, a score for a place may be based at least in part on a user's distance from the place, and the closer the user is to that place, the higher the score may be. As an example and not by way of limitation, in response to a query from a user, a computing system may determine that the user is located approximately 50 meters from place 400A and approximately 100 meters from place 400B, and, based on these determined distances, the computing system may send a response to the user indicating place 400A with a score of 0.9 and place 400B with a score of 0.7. In particular embodiments, one or more scores for one or more places or objects may be based at least in part on social-graph information associated with the user or the one or more places or objects. Although this disclosure describes particular scores determined with respect to particular user information, this disclosure contemplates any suitable scores determined with respect to any suitable user information.

In particular embodiments, a user of a client system 130 may search for information relating to a specific subject matter (e.g., persons, places, content, or resources) by providing a short phrase describing the subject matter, often referred to as a "search query," to a search engine. The search engine may conduct a search based on the query phrase using various search algorithms and generate search results that identify resources (e.g., webpages, content, or other information) that are most likely to be related to the search query. To conduct a search, a user may input or transmit a search query to the search engine, which may be hosted by a search-engine system 170. In response, the search engine may identify one or more resources that are likely to be related to the search query, which may collectively be referred to as a "search result" identified for the search query. The search results may be presented to the user, often in the form of a list of links on search-results webpage, each link being associated with a different webpage that contains some of the identified resources or content. In particular embodiments, each link in the search results may be in the form of a Uniform Resource Locator (URL) that specifies where the corresponding webpage is located and the mechanism for retrieving it. The user may then be able to click on the URL links to view the specific resources contained in the corresponding webpages as he wishes. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are relatively more relevant to the search query or to the user may be ranked higher than the resources that are relatively less relevant to the search query or the user. In particular embodiments, the search engine may limit its search to resources and content on the online social network. However, in particular embodiments, the search engine may also search for resources on other sources, such as third-party systems, the internet or World Wide Web, or other suitable sources.

In particular embodiments, the search-engine system 170 may use a forward index, a reverse index, or location information associated with a user when generating search results in response to a search query received from the user. A user with a client system 130 may transmit a search query to the search-engine system 170. The user may be searching for particular places, objects, or types of places or objects. In particular embodiments, the user may be a user of an online social network, and may be searching for places, locations, or persons represented as social-graph entities on a social graph 200. Additionally, the client system 130 may also transmit location information to the search-engine system 170. The location of the user may be transmitted with the search query, or separately. The user's location may be located within a particular tile of a map. In particular embodiments, a user may opt in to this service, which causes the client application to automatically transmit location data of the user to the social-networking system 160 or the search-engine system 170. In this manner, the search-engine system 170 may track the client system 130's location (and thus, the user's location) and provide search results that are customized for the user based on the user's current location. The search-engine system 170 may then identify places or objects that correspond to the user's search query. The identified places or objects may then be scored and/or ranked based on their relevance to the query, social-relevance, distance from the user, other suitable factors, or any combination thereof. Places or objects having locations within or near the same map tile as the user may be considered more relevant, and thus in order to improve the quality of the generated search results, the search-engine system 170 may generate search results preferentially listing objects located in the same tile as the user. If there are not enough search results available in the user's current tile, then the search-engine system 170 may expand its search to neighboring tiles, or the parent tile associated with the tile the user is in. By initially searching for results in the user's current tile (and possibly neighbor/parent tiles), the search-engine system 170 may improve both the efficiency and quality of the search results generated. This may also enable efficient indexing of search information. Although this disclosure describes generating particular search results based on tile maps and location information a particular manner, this disclosure contemplates generating any suitable search results based on tile maps and location information in any suitable manner.

In particular embodiments, the search-engine system 170 may identify one or more places or objects corresponding to a query from the client system 130. As described above, the querying user may have a first location in a first tile. Similarly, each place or object may have a second location (for example, in the first tile or another tile). Note that in the case of certain objects, such as persons, the location of the object may not be fixed. In other words, an object may be mobile, and the location of that object may be determined analogously to the first user, as described previously. As an example and not by way of limitation, the first user may input the query "show me the nearest park." The search-engine system 170 may parse this text query (such as, for example, by identifying one or more n-grams and identifying corresponding objects and search filters), and search for parks located within the first tile. If the search-engine system 170 is unable to identify a sufficient number of places or objects within the first tile, then the search-engine system 170 may expand its search to neighboring tiles, or the parent tile of the first tile, and identify places or objects within those tiles. In particular embodiments, the search-engine system 170 may calculate the distance from the first location to each second location and then identify only those places or objects having a distance from the first user less than a threshold distance. Thus, places or objects that are beyond a certain distance may be filtered out of the search results regardless of which tile they are located in. In particular embodiments, the search-engine system 170 may then score each of the identified places or objects based on their relevance to the query or the user. Although this disclosure describes identifying particular places or objects corresponding to particular search queries, this disclosure contemplates identifying any suitable places or objects corresponding to any suitable search queries.

In particular embodiments, the search-engine system 170 may determine a score for each identified place or object corresponding to the search query based on the distance of the place or object from the first location (e.g., the location of the querying user or his client system 130). When searching for particular places or objects, the user may be more interested in locating places or objects that are closer to the user's current location. Thus, places or objects that are proximal to the user may be scored more highly than places or objects that are more distant from the user. Although this disclosure describes determining scores for places or objects in a particular manner, this disclosure contemplates determining scores for places or objects in any suitable manner.

In particular embodiments, a search-engine system 170 may determine a score for an identified place or object based social-graph information corresponding to the place or object. A particular place or object may correspond to a social-graph entity, such as, for example, a user node 202 or a concept node 204. Thus, in response to a search query, the search-engine system 170 may access a social graph 200 on the social-networking system 160. The search-engine system 170 may then identify user nodes 202 or concept nodes 204 that correspond to the first query. The search-engine system 170 may then determine a score for the identified places or objects based on the social-graph information corresponding to those places or objects. As an example and not by way of limitation, when determining a score, s, for a place or object that corresponds to a search query, the calculation of the score may also factor in social-graph information. Thus, the score determined for a particular social-graph entity, k, given a particular search query, X, and social-graph information, G, may be calculated as $s=(k|X, G)$. In particular embodiments, the search-engine system 170 may score places or objects based on the proximity of one or more of the first user's social contacts to the place or object. As an example and not by way of limitation, the search-engine system 170 may access the social-networking system 160 and a location database containing location data of other users of the social-networking system 160, and identify one or more places or objects corresponding to the search query from the first user that one or more of the first user's first-degree friends are currently proximate to (e.g., based on check-in data, GPS coordinates, or other location data). The search-engine system 170 may then score places or objects higher if they are closer to the first user's friends, and score places or objects lower if they are distant from the first user's friends. As another example and not by way of limitation, the search-engine system 170 may identify one or more social contacts of the first user who are associated with the place or object, such as, for example, a social contact who had "checked-in" previously to the place or object, a social contact who has reviewed or commented on the place or object, or otherwise interacted with the place or object. The social-engine system 170 may then score places or objects that are more closely associated with the social contacts of the first user higher than places or objects that are less associated with the first user's social contacts. In particular embodiments, the score for an identified place or object may be based on the degree of separation between the user node 202 of the first user and the particular social-graph entity corresponding to the identified place or object. Places or objects corresponding to social-graph entities that are closer in the social graph 200 to the querying user (i.e., fewer degrees of separation between the element and the first user's user node 202) may be given higher scores than social-graph entities that are further from the user (i.e., more degrees of separation). Although this disclosure describes determining scores for particular places or objects based on particular social-graph information in a particular manner, this disclosure contemplates determining scores for any suitable places or objects based on any suitable social-graph information in any suitable manner.

In particular embodiments, the search-engine system 170 may determine the score for an identified place or object based on a search history associated with the first user (i.e., the querying user). Places or objects corresponding to particular webpages or social-graph entities that the first user has previously accessed may be more likely to be the target of the user's query. Similarly, places or objects having locations that the first user has previously been to may be more likely to be the target of the user's query. Thus, these places or objects may be given a higher score. As an example and not by way of limitation, if the first user has previously visited a concept-profile page for the "Old Pro" bar, when determining the score for places or objects in response to a query for "beer," the search-engine system 170 may determine that the webpage corresponding to the bar "Old Pro" has a relatively high score because the querying user has previously accessed the page for the venue. Although this disclosure describes determining scores for particular places or objects based on particular search history information in a particular manner, this disclosure contemplates determining scores for any suitable places or objects based on any suitable search history information in any suitable manner.

In particular embodiments, the search-engine system 170 may generate search results comprising references to one or more of the identified places or objects. The reference may include, for example, a name and/or description of the place or object, the location of the place or object and its distance from the user, a link (e.g., URL) to a profile page or other webpage associated with the place or object, social-graph information related to the place or object (e.g., degree of separation, relation to other social-graph elements), other information associated with the place or object, or any combination thereof. In particular embodiments, the search-engine system 170 may only generate search results comprising references to identified places or objects having a rank greater than a threshold rank. The threshold rank may be set so that a particular number of references are included in the search results. As an example and not by way of limitation, the search-engine system 170 may generate search results comprising references to only the top-R ranking places or objects. The value of R may be determined manually by the user or set by the search-engine system 170. Additionally, the value of R may be based on the size of available local storage on the user's client system 130, the bandwidth available to transmit the search results to the client system 130, the size of the display screen on the client system 130, or based on other suitable factors. In particular embodiments, the search-engine system 170 may generate a ranked list of places or objects based on the scores determined for the places or objects. Places or objects with better (e.g., higher) scores may be ranked higher than places or objects with worse (e.g., lower) scores. In particular embodiments, the search-engine system 170 may generate search results where particular fractions of the generated search results have particular geographic proximities to the first user on the tile map. As an example and not by way of limitation, the search-engine system 170 may generate search results where 60% of the search results comprise references to places or objects located within or associated with the first tile (i.e., the current tile of the user), 30% of the search results comprise references to places or objects located within neighboring tiles of the first tile, and 10% of the search results comprise references to places or objects located in the parent tile of the first tile. Although this disclosure describes generating particular search results in a particular manner, this disclosure contemplates generating any suitable search results in any suitable manner.

In particular embodiments, the search-engine system 170 may transmit the search results to the client system 130 from which the search query was received (e.g., the querying user's computing device). The search results may be transmitted as a structured document, such as a webpage, an email, or another suitable document. These transmitted search results may then be displayed to the user on the client system 130. As an example and not by way of limitation, the search-engine system 170 may transmit a webpage to the client system 130 that includes a map displaying the location of the user and of various places or objects referenced in the search results. As another example and not by way of limitation, the search-engine system 170 may transmit a document listing the references to the identified places or objects, along with other relevant information about the places or objects. In particular embodiments, the search-engine system 170 may also transmit advertisements or other sponsored content to the client system 130 in response to the search query. The advertisements may be included as part of the search results, or separately. The advertisements may correspond to one or more of the places or objects referenced in the search results. Although this disclosure describes transmitting particular search results in a particular manner, this disclosure contemplates transmitting any suitable search results in any suitable manner.

Figure 9:
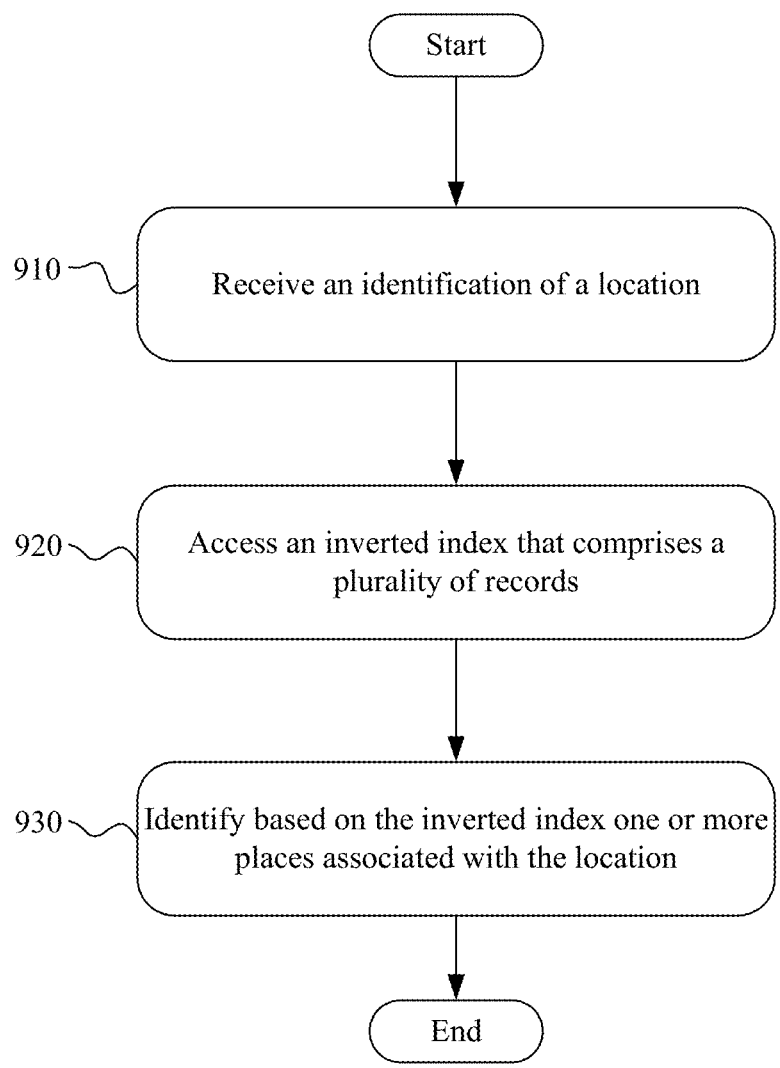
FIG. 9 illustrates an example method for identifying places associated with a location.

FIG. 9 illustrates an example method 900 for identifying one or more places associated with a location. The method may begin at step 910, where a computing device receives an identification of a location. At step 920, a computing device may access an inverted index that comprises an plurality of records. In particular embodiments, each record of an inverted index may correspond to a map tile and may identify one or more places corresponding to the map tile. In particular embodiments, at least one of the places identified in the inverted index may be identified in a plurality of records corresponding to a plurality of map tiles, wherein the plurality of map tiles collectively define an area that circumscribes the place. At step 930, a computing device may identify based on the inverted index one or more places associated with the location, at which point the method may end. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for identifying one or more places associated with a location including the particular steps of the method of FIG. 9, this disclosure contemplates any suitable method for identifying one or more places associated with a location including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
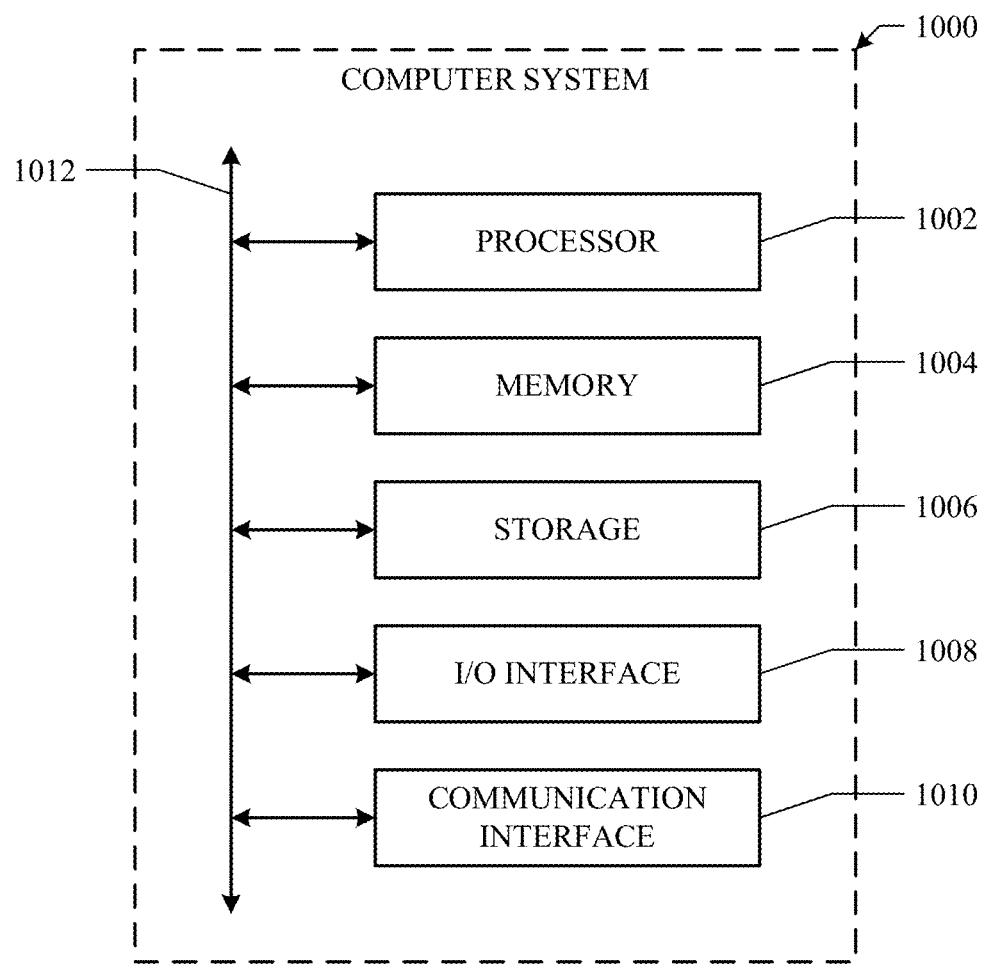
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, receiving an identification of a location;
   by a computing device, accessing an inverted index that comprises a plurality of records, wherein:
      each record corresponds to a map tile and identifies one or more places corresponding to the map tile; and
      each place of the one or more places is modeled as a polygon that circumscribes the place, wherein:
         the place corresponds to a plurality of map tiles, wherein each map tile is at least partially contained within the polygon;
         each of the plurality of map tiles comprises a sample point, wherein the sample point is located within or on a border of the polygon; and
         the place is identified in a plurality of records of the inverted index corresponding to the plurality of map tiles, wherein the plurality of map tiles correspond to the polygon that circumscribes the place;
   by a computing device, identifying based on the inverted index one or more places associated with the location; and
   by a computing device, determining a score for each of the one or more identified places associated with the location, wherein the score for a place is based at least in part on one or more physical distances between the location and one or more respective sample points of the map tiles corresponding to the place.

2. The method of claim 1, wherein a place is associated with the location if the location is within a map tile of the plurality of map tiles that correspond to the place.

3. The method of claim 1, wherein a place is associated with the location if the location is within a pre-determined threshold distance of one or more of the plurality of map tiles that correspond to the place.

4. The method of claim 1, further comprising, by a computing device, accessing a forward index that corresponds to one of the places identified as being associated with the location, wherein the forward index comprises location identifiers of the map tiles that correspond to the place.

5. The method of claim 4, further comprising, by a computing device, determining based on the forward index a shortest distance between the location and the place.

6. The method of claim 1, wherein receiving the identification of the location comprises receiving a query that identifies the location.

7. The method of claim 6, wherein the query identifies a particular place in addition to the location.

8. The method of claim 7, wherein identifying based on the inverted index one or more places associated with the location comprises determining whether at least part of the particular place is located within a map tile associated with the location.

9. The method of claim 1, wherein a distance between the location and the place is a minimum of the distances between the location and the sample points of the map tiles corresponding to the place.

10. The method of claim 1, wherein the score for the place is further based at least in part on social-graph information associated with the place.

11. One or more computer-readable non-transitory storage media embodying software that is operable when executed to:
   receive an identification of a location;
   access an inverted index that comprises a plurality of records, wherein:
      each record corresponds to a map tile and identifies one or more places corresponding to the map tile; and
      each place of the one or more places is modeled as a polygon that circumscribes the place, wherein:
         the place corresponds to a plurality of map tiles, wherein each map tile is at least partially contained within the polygon;
         each of the plurality of map tiles comprises a sample point, wherein the sample point is located within or on a border of the polygon; and
         the place is identified in a plurality of records of the inverted index corresponding to the plurality of map tiles, wherein the plurality of map tiles correspond to the polygon that circumscribes the place;
   identify based on the inverted index one or more places associated with the location; and
   determine a score for each of the one or more identified places associated with the location, wherein the score for a place is based at least in part on one or more physical distances between the location and one or more respective sample points of the map tiles corresponding to the place.

12. The media of claim 11, wherein a place is associated with the location if the location is within a map tile of the plurality of map tiles that correspond to the place.

13. The media of claim 11, wherein a place is associated with the location if the location is within a pre-determined threshold distance of one or more of the plurality of map tiles that correspond to the place.

14. The media of claim 11, wherein the software is further operable when executed to access a forward index that corresponds to one of the places identified as being associated with the location, wherein the forward index comprises location identifiers of the map tiles that correspond to the place.

15. The media of claim 14, wherein the software is further operable when executed to determine based on the forward index a shortest distance between the location and the place.

16. The media of claim 11, wherein receiving the identification of the location comprises receiving a query that identifies the location.

17. The media of claim 16, wherein the query identifies a particular place in addition to the location.

18. The media of claim 11, wherein a distance between the location and the place is a minimum of the distances between the location and the sample points of the map tiles corresponding to the place.

19. The media of claim 11, wherein the score for the place is further based at least in part on social-graph information associated with the place.

20. A system comprising:
one or more processors; and
a memory coupled to the processors comprising instructions executable by the processors, the processors being operable when executing the instructions to:
 receive an identification of a location;
 access an inverted index that comprises a plurality of records, wherein:
  each record corresponds to a map tile and identifies one or more places corresponding to the map tile; and
  each place of the one or more places is modeled as a polygon that circumscribes the place, wherein:
   the place corresponds to a plurality of map tiles, wherein each map tile is at least partially contained within the polygon;
   each of the plurality of map tiles comprises a sample point, wherein the sample point is located within or on a border of the polygon; and
   the place is identified in a plurality of records of the inverted index corresponding to the plurality of map tiles, wherein the plurality of map tiles correspond to the polygon that circumscribes the place;
 identify based on the inverted index one or more places associated with the location; and
 determine a score for each of the one or more identified places associated with the location, wherein the score for a place is based at least in part on one or more physical distances between the location and one or more respective sample points of the map tiles corresponding to the place.

* * * * *